(12) United States Patent
Ueshima

(10) Patent No.: US 7,537,728 B2
(45) Date of Patent: May 26, 2009

(54) METHOD FOR INCREASING THE EFFECTIVENESS OF A COMPONENT OF A MATERIAL

(75) Inventor: Minoru Ueshima, Misato (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 470 days.

(21) Appl. No.: 10/866,102

(22) Filed: Jun. 14, 2004

(65) Prior Publication Data

US 2005/0005736 A1    Jan. 13, 2005

Related U.S. Application Data

(60) Provisional application No. 60/477,938, filed on Jun. 13, 2003.

(51) Int. Cl.
*C22C 13/00*    (2006.01)

(52) U.S. Cl. .................. 420/557; 148/24; 228/180.1

(58) Field of Classification Search ............... 420/559; 228/260, 269; 75/255
See application file for complete search history.

(56) References Cited

U.S. PATENT DOCUMENTS

| 6,033,488 | A | 3/2000 | An et al. .................. 148/24 |
| 6,241,942 | B1 | 6/2001 | Murata et al. ............. 420/561 |
| 6,474,537 | B1 * | 11/2002 | Hasegawa et al. ........ 228/260 |
| 6,488,888 | B2 | 12/2002 | Murata et al. ............. 420/561 |
| 6,503,338 | B1 | 1/2003 | Taguchi et al. ............. 148/23 |
| 6,517,602 | B2 * | 2/2003 | Sato et al. ................. 75/255 |
| 6,824,039 | B2 | 11/2004 | Wu et al. ................. 228/56.3 |

FOREIGN PATENT DOCUMENTS

JP    55128571 A  * 10/1980

* cited by examiner

*Primary Examiner*—George Wyszomierski
*Assistant Examiner*—Weiping Zhu
(74) *Attorney, Agent, or Firm*—Michael Tobias

(57) ABSTRACT

A manufacturing method for a material increases the effectiveness of a component so the component can be present in an amount which does not produce undesirable effects. A material is prepared containing the component in a first concentration. The component is at least partially removed to lower the concentration of the component to a second concentration. The concentration of the component may then be increased to a third concentration above the second concentration.

18 Claims, No Drawings

METHOD FOR INCREASING THE EFFECTIVENESS OF A COMPONENT OF A MATERIAL

REFERENCE TO RELATED APPLICATIONS

This application claims the benefit of U.S. Provisional Application No. 60/477,938 filed on Jun. 13, 2003.

BACKGROUND OF THE INVENTION

1. Field of the Invention

This invention relates to a method of increasing the effectiveness of a chemical component of a material at extremely low concentrations. Some examples of such components are P, Ge, and Ga, which are added to solders and other alloys as deoxidizing components.

2. Description of the Related Art

P, Ge, and Ga are highly effective in very small amounts at suppressing oxidation in metals, and it is well known to employ these elements as components of alloys, such as solder alloys. However, if present in too large a concentration, they can have undesirable effects on the materials to which they are added. For example, if P is present in a solder alloy in a concentration of greater than 50 ppm, it can have an adverse effect on the workability of the alloy. At the same time, at a concentration of less than 50 ppm, it may be difficult for P to consistently exert the desired oxidation suppressing effect. Therefore, it is often difficult to find the right level of P at which it can exert its desired benefits without deteriorating the properties of the material to which it is added. Similar problems occur with Ga and Ge when used in solder alloys.

SUMMARY OF THE INVENTION

The present invention provides a method of increasing the effectiveness of a component of a material so that the component can consistently exert its desired effect at a significantly lower concentration than at which it has been possible to use the component in the past.

The effectiveness of the component can be increased in various ways.

According to one aspect of the present invention, a material containing the component in a first concentration is prepared, and then the concentration of the component is reduced substantially to zero. As a result, the effectiveness of each of the alloying components of the composition from which the component was removed can be stably exerted. Taking a solder alloy as an example, the wettability of the solder is improved, the formation of voids is suppressed, and melting and coalescing of solder alloy particles during reflow soldering is promoted.

According to another aspect of the present invention, the effectiveness is increased by first preparing a material containing the component in a first concentration, then reducing the amount of the component to lower its concentration to a second concentration lower than the first concentration, and then increasing the amount of the component in the material to increase its concentration to a third concentration greater than the second concentration. The second concentration may be nonzero, in which case the concentration of the component is simply lowered, or it may be substantially zero, in which case the component is substantially entirely removed from the material. The third concentration may be the same as or different from (either higher or lower than) the first concentration. The initial presence and subsequent at least partial removal of the component increases the effectiveness of the component at the third concentration. As with the first aspect, when the material is a solder, this method improves the wettability of the solder, suppresses the formation of voids during soldering, and promotes melting and coalescing of solder alloy particles during reflow soldering.

In preferred embodiments, the material containing the component is a solder alloy, and the component is a deoxidizing element such as P, Ge, or Ga. The component can be removed from the solder alloy by existing techniques well known in the art for removing such elements. For example, P can be removed from a melt by bubbling steam, an oxygen-containing gas such as air, or an oxygen-rich gas through the melt to oxidize P and form it into dross which floats on the surface of the melt. The dross can then be skimmed off or otherwise removed from the melt by conventional procedures. Alternatively, dross can be formed by the addition to the melt of a substance (either a gas, liquid, or solid) containing a component which promotes the oxidation of P, or a substance which forms a P-containing compound which is not soluble in Sn, In, Bi, Pb, Zn, or alloys thereof. Thus, the component can be removed from the melt by the addition to the melt of any substance which can form the component into an oxide or other compound which can easily be separated from molten solder.

The first concentration is typically in the range of 10 to 100 ppm. In preferred embodiments, the second concentration is 5 ppm or less and may be substantially zero. In the aspect of the invention in which the concentration of the component is increased to the third concentration after being reduced to the second concentration, the third concentration is typically in the range of 1 to 500 ppm. When the component is P and the material in which it is contained is a solder alloy, the third concentration is preferably 3 to 200 ppm.

When the concentration of the component is decreased by bubbling a gas through the melt, the second concentration can be adjusted by controlling various factors such as the rate of bubbling, the length of time for which bubbling is performed, and the temperature of the melt.

When the component is added to a material in a molten state, it is often advantageous to carry out the addition in an inert atmospheres such as a nitrogen or argon atmosphere, particularly when the melt is at a higher temperature.

The component may be added to a melt to achieve the first concentration, or a melt may be prepared so as to initially have the component present in the first concentration.

The present invention can be used with a wide variety of alloys, including both lead-free and lead-containing alloys, such as Sn-base solder alloys and Sn—Pb-base solder alloys. The resulting solder alloy can be processed into any desired form and used in the same manner as conventional solder alloys. For example, the solder can be formed into ingots, ribbons, rods, solder balls, or a paste, and it can be used for dip soldering, flow soldering, reflow soldering, and other soldering techniques.

Other examples of materials with which the present invention can be employed are various types of alloys other than solder alloys, organic materials, and foods.

A method according to the present invention can significantly lower the level at which certain components can produce beneficial effects. For example, with conventional manufacturing methods for solder alloys, it is difficult for P to consistently prevent oxidation of a solder when present in an amount of less than 20 ppm, but according to the present invention, P is effective when present in a solder alloy in an amount of 15 ppm or less.

In preferred embodiments, the concentration of a single component of a material is adjusted to increase its effectiveness, but the method of the present invention may also be used to adjust the concentration of a plurality of different components of a material.

DESCRIPTION OF PREFERRED EMBODIMENTS

The present invention will be further described by the following examples. Unless otherwise indicated, the % of a component indicates mass %. In addition, ppm refers to parts per million by mass.

EXAMPLE 1

A solder melt having a composition of Sn-3% Ag-0.5% Cu is prepared by standard metallurgical techniques. With the melt maintained at a temperature of 250° C., P is added to give the melt a P concentration of 20 ppm. Air is then bubbled through the melt for 25 minutes to oxidize the P in the melt. The oxidized P forms dross which floats on the surface of the melt, and the dross is skimmed off the surface and removed from the melt. In this manner, the P concentration of the melt is reduced to substantially 0 ppm. The melt is then cast to form ingots. The ingots can be subsequently used for soldering in a conventional manner. For example, the ingots can be melted to prepare a solder bath for dip or flow soldering.

EXAMPLE 2

In the same manner as in Example 1, a solder melt having a composition of Sn-3% Ag-0.5% Cu is prepared. With the melt maintained at a temperature of 250° C., P is added to give the melt a P concentration of 20 ppm. Air is then bubbled through the melt for 25 minutes to form a dross containing oxidized P, and the dross is skimmed off the surface and removed from the melt. In this manner, the P concentration of the melt is reduced to substantially 0 ppm. Additional P is then added to the melt to bring the concentration of P in the melt to 5 ppm. The melt is then cast to form ingots.

EXAMPLE 3

Example 2 is repeated except that instead of adding P to a melt, the raw materials (Sn, Ag, Cu, and P) are combined in a crucible and melted to form a solder melt having a composition of Sn-3% Ag-0.5% Cu-20 ppm P. Air is then bubbled through the melt for 25 minutes, and the resulting dross containing oxidized P is removed from the melt to lower the P concentration of the melt to substantially 0 ppm. Additional P is then added to the melt to bring the concentration of P in the melt to 5 ppm. The melt is then cast to form ingots.

EXAMPLE 4

The procedure of Example 1 is repeated using a Sn-3% Ag solder alloy as a starting material instead of a Sn-3% Ag-0.5% Cu alloy.

EXAMPLE 5

In this example, the procedure of Example 2 is repeated except that Ge is used instead of P. Ge is initially added to the melt to achieve a concentration of 20 ppm. The Ge concentration is then lowered to substantially 0 ppm by bubbling air through the melt and removing the resulting dross from the surface of the melt. Sufficient Ge is then added to give the melt a Ge concentration of 10 ppm. The melt is then cast into ingots.

EXAMPLE 6

In this example, the procedure of Example 2 is repeated except that Ga is used instead of P. Ga is initially added to achieve a concentration of 25 ppm. The Ga concentration is then lowered to substantially 0 ppm by bubbling with air and removing the resulting dross from the surface of the melt. Sufficient Ga is then added to give a concentration of 15 ppm. The melt is then cast into ingots.

EXAMPLE 7

A melt having a composition of Sn-0.75% Cu is prepared by standard metallurgical techniques. With the melt maintained at a temperature of 250° C., P is added to give the melt a P concentration of 20 ppm. Air is then bubbled through the melt for 25 minutes to lower the P concentration to substantially 0 ppm, and the resulting dross is removed from the surface of the melt. Additional P is then added to the melt to bring the concentration of P to 40 ppm, and stirring is performed to homogenize the melt. The melt temperature is then increased to 280° C., and casting of ingots is performed.

If P were initially added in a concentration of 40 ppm, a portion of the P would be unable to exert its desired effect. By first adding P, then removing P, and then adding P again, the entire 40 ppm of P are effective. As a result, the oxidation preventing effect of P can be effectively exerted over a long period of time.

EXAMPLE 8

The procedure of Example 7 is repeated but using a melt having a composition of Sn-0.7Cu-0.006Ni or Sn-0.7Cu-0.02Ni as a starting material to obtain a solder alloy according to the present invention having a composition of Sn-0.7Cu-0.006Ni-0.003P or Sn-0.7Cu-0.02Ni-0.003P.

EXAMPLE 9

In this example, the effects of a treatment method according to the present invention were investigated using solder alloys prepared by the procedures of Examples 1 and 2.

(1) Suppression of Voids

Soldering in Air

Solder pastes each comprising one of the alloys having the compositions shown in Table 1 were applied by printing to a thickness of 0.15 mm to copper lands measuring 0.5 mm×0.5 mm of a printed circuit board. Copper pieces measuring 5 mm×5 mm×0.3 mm were then mounted on the paste on each land. Alloys 2 and 4 were alloys prepared by the procedures described by Example 1 and Example 2, respectively, including P removal treatment. Alloys 1 and 3 were comparative alloys which had the same composition as Alloys 2 and Alloy 4, respectively, but which had not undergone the P removal treatment employed in Examples 1 and 2.

Each circuit board was then heated in air at 220° C. or higher for 40 seconds with a peak temperature of 235° C. to perform reflow with a total reflow time of 4 minutes and form soldered joints connecting the copper pieces to the lands of the printed circuit board.

The resulting soldered joints were observed for the occurrence of voids with a transmission X-ray apparatus. The occurrence of voids was evaluated by a voids rate, which was the value, expressed as a percent, of the area of the voids which were observed divided by the soldered area. The results are shown in Table 1.

TABLE 1

| Alloy No. | Alloy composition | Properties | |
|---|---|---|---|
| | | P removal treatment performed? | Voids rate (%) |
| 1 | Sn3Ag0.5Cu | no | 51 |
| 2 | Sn3Ag0.5Cu | yes | 32 |
| 3 | Sn3Ag0.5Cu0.0005P | no | 48 |
| 4 | Sn3Ag0.5Cu0.0005P | yes | 14 |

From Table 1, it can be seen that the formation of voids during soldering in air of the alloys according to the present invention (Alloys 2 and 4) was greatly suppressed compared to the formation of voids for alloys having the same compositions which had not undergone P removal treatment (Alloys 1 and 3).

Soldering in a Nitrogen Atmosphere

Solder pastes containing the same alloys as used in the preceding test were each applied by printing to a thickness of 0.15 mm onto Au lands with a diameter of 0.5 mm of a printed circuit board. Each circuit board was heated at a temperature of at least 220° C. for 40 seconds in a nitrogen atmosphere with an oxygen concentration of at most 500 ppm to perform reflow with a peak temperature of 235° C. and a total reflow time of 4 minutes to form solder bumps on the lands.

The resulting solder bumps were observed for the occurrence of voids with a transmission X-ray apparatus. Among 80 bumps, the number of bumps having voids with a diameter of at least 20 μm or at least 50 μm in size was counted. The results are shown in Table 2.

TABLE 2

| Alloy No. | Alloy composition | P treatment performed? | Properties | |
|---|---|---|---|---|
| | | | Number of bumps having voids of at least 20 μm in diameter | Number of bumps having voids of at least 50 μm in diameter |
| 1 | Sn3Ag0.5Cu | no | 43 | 26 |
| 2 | Sn3Ag0.5Cu | yes | 32 | 9 |
| 3 | Sn3Ag0.5Cu0.0005P | no | 47 | 22 |
| 4 | Sn3Ag0.5Cu0.0005P | yes | 30 | 2 |

As shown in Table 2, the formation of voids during soldering in nitrogen of the alloys according to the present invention (Alloys 2 and 4) was far less than formation of voids for alloys having the same compositions which had not undergone P removal treatment (Alloys 1 and 3).

(2) Improvement of the Melting Properties of Solder Paste

Solder pastes each containing powder of one of the 4 alloys used in the previous tests with a particle diameter of approximately 20 μm were prepared. Each paste was printed in air to a thickness of 0.15 mm onto copper lands of a printed circuit board. The lands varied in size from 0.12 to 0.5 mm in diameter. Each circuit board was then heated in air at 220° C. or higher for 40 seconds with a peak temperature of 235° C. to perform reflow with a total reflow time of 4 minutes to form solder bumps.

After the heating, each of the solder bumps on the printed circuit boards was observed with a stereomicroscope to determine whether the solder powder in the bump had completely melted. The results are shown in Table 3.

TABLE 3

| Alloy No. | Alloy composition | P treatment performed? | Properties | | |
|---|---|---|---|---|---|
| | | | Smallest land diameter for which melting occurred on all lands (mm) | Largest land diameter for which melting did not occur on at least 20% of lands (mm) | Largest land diameter for which melting did not occur on at least 50% of lands (mm) |
| 1 | Sn3Ag0.5Cu | no | 0.32 | 0.30 | 0.28 |
| 2 | Sn3Ag0.5Cu | yes | 0.30 | 0.28 | 0.26 |
| 3 | Sn3Ag0.5Cu0.0005P | no | 0.32 | 0.30 | 0.28 |
| 4 | Sn3Ag0.5Cu0.0005P | yes | 0.28 | 0.26 | 0.24 |

In general, it becomes more difficult to completely melt a solder paste applied to a land during reflow soldering as the diameter of the land decreases. Therefore, in each column of Table 3, the smaller the diameter of the land, the better are the melting properties of the solder. From Table 3, it can be seen that the alloys according to the present invention which had undergone P removal treatment (Alloys 2 and 4) had better melting properties than did alloys having the same compositions which had not undergone P removal treatment (Alloys 1 and 3).

EXAMPLE 10

In this example, the ability of an alloy according to the present invention to suppress the formation of dross during wave soldering was investigated.

The various alloys having the compositions shown in Tables 4 and 5 were prepared, either by the method of the present invention or by a conventional method. The alloys for which P removal treatment was performed were examples of the present invention, while the remaining alloys for which P removal treatment was not performed were comparative examples.

Each solder was disposed in a wave soldering pot with a capacity of approximately 330 kg equipped with a primary and second nozzle. The soldering pot was operated to form the solder into waves, and the amount of dross which was formed by the waves was measured. The temperature of the molten solder in the solder pot was set to 255° C., and the height of the wave formed above each nozzle was 8 mm.

Dross formed on the surface of the molten solder in the solder pot was collected after 3 hours of operation using a dross collecting tool. The dross collecting tool was formed by flattening the scooping portion of a perforated stainless steel ladle and then bending the end of the flattened scooping portion upwards by approximately 90° to define a flat region with a width of approximately 38 mm. The tool had a total of 28 perforations, each with a diameter of approximately 4.5 mm. The flat region contained 25 of the perforations.

When the dross collecting tool was used to skim dross of the surface of the molten solder, a certain amount of molten solder tended to be collected together with the dross. The molten solder was permitted to drip through the perforations in the tool until substantially only dross remained on the tool, and then the dross was placed into a stainless steel vat and weighed.

Tables 4 and 5 show the average rate of dross formation, in kg per hour, for each of the alloys.

TABLE 4

| Alloy No. | Alloy Composition | P treatment performed? | Third concentration of P (ppm) | Dross formation (kg/hour) |
|---|---|---|---|---|
| 1 | Sn3Ag0.5Cu | no | 0 | 2.1 |
| 2 | Sn3Ag0.5Cu | yes | 0 | 1.9 |
| 5 | Sn3Ag0.5Cu—P | no | 20 | 2.2 |
| 6 | Sn3Ag0.5Cu—P | no | 50 | 1.6 |
| 7 | Sn3Ag0.5Cu—P | yes | 19 | 1.1 |
| 8 | Sn3Ag0.5Cu—P | yes | 52 | 1 |

TABLE 5

| Alloy No. | Alloy Composition | P treatment performed? | Third concentration of P (ppm) | Dross formation (kg/hour) |
|---|---|---|---|---|
| 9 | Sn0.7Cu | no | 0 | 2.2 |
| 10 | Sn0.7Cu | yes | 0 | 1.9 |
| 11 | Sn0.7Cu0.06Ni | no | 0 | 2.1 |
| 12 | Sn0.7Cu0.06Ni | yes | 0 | 1.8 |
| 13 | Sn0.7Cu—P | no | 3 | 2.3 |
| 14 | Sn0.7Cu—P | no | 32 | 1.9 |
| 15 | Sn0.7Cu—P | yes | 9 | 1.2 |
| 16 | Sn0.7Cu—P | yes | 35 | 0.9 |
| 17 | Sn0.7Cu0.06Ni—P | no | 5 | 2.1 |
| 18 | Sn0.7Cu0.06Ni—P | no | 25 | 2.4 |
| 19 | Sn0.7Cu0.06Ni—P | yes | 5 | 1.6 |
| 20 | Sn0.7Cu0.06Ni—P | yes | 45 | 1.0 |

From these tables, it can be seen that a solder prepared by the method of the present invention including P removal treatment could reduce the rate of dross formation during wave soldering compared to a solder which had the same composition but which did not undergo P removal treatment.

EXAMPLE 11

In this example, the effect of the present invention on preventing surface discoloration of molten solder was investigated.

The various alloys having the compositions shown in Tables 6-9 were prepared, either by the method of the present invention or by a conventional method. The alloys for which P removal treatment was performed were examples of the present invention, while the remaining alloys for which P removal treatment was not performed were comparative examples. The alloying elements and the final concentration of P varied among the alloys. Approximately 100 g of each alloy were placed into a separate stainless steel laboratory dish having a diameter of 10 mm, and the solder was maintained at 250° C. to melt it. An oxide film on the surface of the solder was removed, and then 5 minutes later, the surface coloration was observed.

The results are shown in Tables 6-9. A yellow surface indicate surface oxidation, while a whitish silver surface indicates a good surface condition which is free of oxidation. From these results, it is expected that an alloy with a whitish silver surface can form a molten solder bath for flow soldering with little oxidation of the surface of the melt, which results in better soldered joints.

TABLE 6

| Alloy No. | Alloy Composition | P treatment performed? | Third concentration of P (ppm) | Surface coloration |
|---|---|---|---|---|
| 1 | Sn3Ag0.5Cu | no | 0 | yellow |
| 2 | Sn3Ag0.5Cu | yes | 0 | yellow |
| 21 | Sn3Ag0.5Cu—P | no | 20 | yellow |
| 22 | Sn3Ag0.5Cu—P | no | 50 | pale yellow |
| 23 | Sn3Ag0.5Cu—P | no | 80 | whitish silver |
| 24 | Sn3Ag0.5Cu—P | yes | 2 | whitish silver |
| 25 | Sn3Ag0.5Cu—P | yes | 19 | whitish silver |
| 26 | Sn3Ag0.5Cu—P | yes | 52 | whitish silver |

TABLE 7

| Alloy No. | Alloy Composition | P treatment performed? | Third concentration of P (ppm) | Surface coloration |
| --- | --- | --- | --- | --- |
| 27 | Sn0.7Cu0.2Ni | no | 0 | yellow |
| 28 | Sn0.7Cu0.2Ni | yes | 0 | yellow |
| 29 | Sn0.7Cu0.2Ni—P | no | 22 | yellow |
| 30 | Sn0.7Cu0.2Ni—P | no | 43 | pale yellow |
| 31 | Sn0.7Cu0.2Ni—P | no | 90 | whitish silver |
| 32 | Sn0.7Cu0.2Ni—P | yes | 2 | whitish silver |
| 33 | Sn0.7Cu0.2Ni—P | yes | 15 | whitish silver |
| 34 | Sn0.7Cu0.2Ni—P | yes | 52 | whitish silver |

TABLE 8

| Alloy No. | Alloy Composition | P treatment performed? | Third concentration of P (ppm) | Surface coloration |
| --- | --- | --- | --- | --- |
| 35 | Sn—15In | no | 0 | yellow |
| 36 | Sn—15In | yes | 0 | yellow |
| 37 | Sn—15In—P | no | 24 | yellow |
| 38 | Sn—15In—P | no | 49 | pale yellow |
| 39 | Sn—15In—P | no | 78 | whitish silver |
| 40 | Sn—15In—P | yes | 3 | whitish silver |
| 41 | Sn—15In—P | yes | 15 | whitish silver |
| 42 | Sn—15In—P | yes | 48 | whitish silver |

TABLE 9

| Alloy No. | Alloy Composition | P treatment performed? | Third concentration of P (ppm) | Surface coloration |
| --- | --- | --- | --- | --- |
| 43 | Sn57Bi | no | 0 | pale purple |
| 44 | Sn57Bi | yes | 0 | pale purple |
| 45 | Sn57Bi—P | no | 18 | pale purple |
| 46 | Sn57Bi—P | no | 35 | pale yellow |
| 47 | Sn57Bi—P | no | 78 | whitish silver |
| 48 | Sn57Bi—P | yes | 5 | whitish silver |
| 49 | Sn57Bi—P | yes | 20 | whitish silver |
| 50 | Sn57Bi—P | yes | 55 | whitish silver |

What is claimed is:

1. A method of manufacturing a solder alloy comprising:
preparing a molten solder composition containing a component in a first concentration;
removing at least a portion of the component from the molten solder composition to reduce the concentration of the component throughout the molten solder composition to a second concentration below the first concentration; and then
adding an amount of the component to the molten solder composition to increase the concentration of the component throughout the molten solder composition to a third concentration greater than the second concentration.

2. A method as claimed in claim 1 wherein the first concentration is higher than the third concentration.

3. A method as claimed in claim 1 wherein the first concentration is lower than the third concentration.

4. A method as claimed in claim 1 wherein the first concentration is 10-100 ppm and the third concentration is 1-500 ppm.

5. A method as claimed in claim 4 wherein the second concentration is substantially 0 ppm.

6. A method as claimed in claim 1 wherein the component comprises a deoxidizing component.

7. A method as claimed in claim 1 wherein the component comprises P.

8. A method as claimed in claim 1 wherein the component comprises Ge.

9. A method as claimed in claim 1 wherein the component comprises Ga.

10. A method as claimed in claim 1 wherein reducing the concentration of the component comprises substantially entirely removing the component from the molten solder composition.

11. A method as claimed in claim 1 including reducing the concentration of the component by bubbling an oxygen-containing gas through the molten solder composition.

12. A method as claimed in claim 1 wherein the second concentration is at most 5 ppm.

13. A method as claimed in claim 1 wherein the second and third concentrations are concentrations at which the component would not suppress oxidation in the molten solder composition if initially present in the molten solder composition at the second or third concentration.

14. A method as claimed in claim 1 including casting the molten solder composition after increasing the concentration of the component to the third concentration.

15. A method as claimed in claim 1 wherein removing at least a portion of the component comprises introducing into the molten solder composition a substance which combines with the component to form dross and removing the dross from the molten solder composition.

16. A method as claimed in claim 1 wherein the first concentration is 10-100 ppm and the second concentration is at most 5 ppm.

17. A method of manufacturing a solder alloy comprising:
preparing a molten solder composition containing P in a first concentration;
introducing an oxygen-containing substance into the molten solder composition to oxidize at least a portion of the P in the molten solder composition and form a P-containing dross and removing the dross from the molten solder composition to reduce the concentration of P throughout the molten solder composition to a second concentration below the first concentration of at most 5 ppm; and then
adding P to the molten solder composition to increase the concentration of P throughout the molten solder composition to a third concentration greater than the second concentration.

18. A method as claimed in claim 17 wherein introducing an oxygen-containing substance comprises bubbling an oxygen-containing gas through the molten solder composition.

* * * * *